United States Patent
Kim et al.

(10) Patent No.: US 10,680,844 B2
(45) Date of Patent: Jun. 9, 2020

(54) APPARATUS AND METHOD FOR PROVIDING INFORMATION FOR A WIRELESS NETWORK CONNECTION USING WI-FI

(75) Inventors: Ji-Hyeok Kim, Incheon (KR); Joon-Oo Kim, Suwon-si (KR); Won-Sang Kwon, Seoul (KR); Ki-Chul Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 311 days.

(21) Appl. No.: 12/977,262

(22) Filed: Dec. 23, 2010

(65) Prior Publication Data

US 2011/0161480 A1 Jun. 30, 2011

(30) Foreign Application Priority Data

Dec. 24, 2009 (KR) .................. 10-2009-0130915

(51) Int. Cl.
  *G06F 15/173* (2006.01)
  *H04L 12/28* (2006.01)
  *H04L 29/12* (2006.01)
(52) U.S. Cl.
  CPC ...... *H04L 12/2809* (2013.01); *H04L 29/1265* (2013.01); *H04L 61/303* (2013.01); *H04L 2012/2841* (2013.01)
(58) Field of Classification Search
  None
  See application file for complete search history.

(56) References Cited

U.S. PATENT DOCUMENTS

| | | | |
|---|---|---|---|
| 8,185,129 B2* | 5/2012 | Alizadeh-Shabdiz | G01S 5/02 455/456.1 |
| 2004/0264389 A1* | 12/2004 | Abdo | H04L 29/12113 370/255 |
| 2005/0078644 A1 | 4/2005 | Tsai et al. | |
| 2006/0002320 A1* | 1/2006 | Costa-Requena | H04L 12/189 370/312 |
| 2006/0142034 A1* | 6/2006 | Wentink | H04W 8/005 455/515 |
| 2006/0143181 A1* | 6/2006 | Liu | H04L 41/12 |
| 2006/0239208 A1* | 10/2006 | Roberts | H04W 48/14 370/254 |
| 2006/0279774 A1* | 12/2006 | Matsuoka | H04L 12/2803 358/1.15 |

(Continued)

FOREIGN PATENT DOCUMENTS

| | | |
|---|---|---|
| CN | 1894899 | 1/2007 |
| EP | 2 061 216 | 5/2009 |

(Continued)

*Primary Examiner* — Dhairya A Patel
(74) *Attorney, Agent, or Firm* — The Farrell Law Firm, P.C.

(57) ABSTRACT

An apparatus, method, and system for providing information for a wireless network connection using Wi-Fi. Device information for at least one UPnP device is provided from a plurality of wireless devices including the at least one UPnP device, a device information announcement message including the device information for the at least one UPnP device is generated, and the generated device information announcement message is broadcasted. In this way, information on a UPnP device to which to connect a wireless device is provided in advance, and a user can easily perform a network connection.

6 Claims, 8 Drawing Sheets

(56) References Cited

U.S. PATENT DOCUMENTS

| | | | | |
|---|---|---|---|---|
| 2008/0139174 | A1* | 6/2008 | Alve | G06F 21/10 |
| | | | | 455/411 |
| 2008/0304408 | A1* | 12/2008 | Kraemer | H04L 12/2803 |
| | | | | 370/230 |
| 2009/0042557 | A1* | 2/2009 | Vardi | H04W 72/02 |
| | | | | 455/422.1 |
| 2009/0085806 | A1* | 4/2009 | Piersol | G01C 21/206 |
| | | | | 342/386 |
| 2009/0094111 | A1* | 4/2009 | Wu | G06Q 30/02 |
| | | | | 705/14.1 |
| 2009/0131020 | A1* | 5/2009 | van de Groenendaal | |
| | | | | H04L 63/102 |
| | | | | 455/411 |
| 2009/0228591 | A1* | 9/2009 | Mitsunobu | H04L 12/2809 |
| | | | | 709/226 |
| 2009/0287802 | A1* | 11/2009 | Koistinen | H04L 12/2809 |
| | | | | 709/221 |
| 2010/0061294 | A1* | 3/2010 | Proctor, Jr. | H04W 4/029 |
| | | | | 370/328 |
| 2010/0085957 | A1* | 4/2010 | Elias | H04L 45/04 |
| | | | | 370/352 |
| 2011/0082939 | A1* | 4/2011 | Montemurro | H04W 76/14 |
| | | | | 709/227 |
| 2011/0103284 | A1* | 5/2011 | Gundavelli | H04L 12/18 |
| | | | | 370/312 |
| 2012/0059945 | A1* | 3/2012 | Yamaguchi | H04W 8/24 |
| | | | | 709/230 |

FOREIGN PATENT DOCUMENTS

| | | |
|---|---|---|
| KR | 1020100061235 | 6/2010 |
| WO | WO 2005/027437 | 3/2005 |
| WO | WO 2007/010454 | 1/2007 |

\* cited by examiner

FIG.4

APPARATUS AND METHOD FOR PROVIDING INFORMATION FOR A WIRELESS NETWORK CONNECTION USING WI-FI

PRIORITY

This application claims priority to an application filed in the Korean Industrial Property Office on Dec. 24, 2009, and assigned Serial No. 10-2009-0130915, the content of which is hereby incorporated by reference.

BACKGROUND OF THE INVENTION

1. Field of the Invention

The present invention relates generally to an apparatus and method for providing information connecting Universal Plug and Play (UPnP) devices, and more particularly, to an apparatus and method for providing information for connecting UPnP devices using Wireless-Fidelity (Wi-Fi).

2. Description of the Related Art

In general, a home network refers to an Internet Protocol (IP)-based private network that connects various home appliances, such as all types of Personal Computers (PCs), intelligent products, and wireless devices, through a common virtual computing environment called middleware.

More specifically, middleware interconnects various digital devices in a peer-to-peer manner, thereby enabling communication between the devices. For example, Home AV Interoperability (HAVI), UPnP, Java Intelligent Network Infrastructure (Jini), Home Wide Web (HWW) are some of the currently available middleware.

In a computing environment implemented using UPnP middleware, each device is allocated an address from a server pursuant to a Dynamic Host Configuration Protocol (DHCP) or is allocated an address that is selected by an Automatic IP designation function (Auto IP), and performs communication with other devices and search or inquiry on a network through the allocated address.

A UPnP network, which is one of the most widely used home network technologies, defines a UPnP device and a UPnP service, and also defines a protocol between the UPnP device and the UPnP service. Such a UPnP network includes a Controlled Device (CD) that is a home network device connected to and controlled by an IP-based home network, and a Control Point (CP) that is a device for controlling the CD. Accordingly, the CP is a constituent element for requesting an event from the CD and receiving the requested event. The CD performs a given function at the request of the CP, and is an constituent element for sending an event to the CP, which has requested the event, when its state is changed.

Operation processes that are performed between devices in a conventional UPnP network include an advertisement process, a discovery process, a description process, a control process, and an eventing process.

In the advertisement process, a new CD is connected to a home network and advertises its existence to other CDs on the home network.

In the discovery process, a new CP is connected to a home network and searches for CDs operating on the home network.

In the description process, a CP recognizes the function of a newly added CD in more detail by parsing a service description eXtensible Markup Language (XML) or device description XML file using the IP address of the CD acquired in the discovery process, in order to control the CD.

In the control process, when a CP is to provide a specific service through a CD, the CP sends an action request for the given service to the corresponding CD by using a Simple Object Access Protocol (SOAP) according to a UPnP device architecture, and receives a result/variable value in response to the action request.

The eventing process checks the information change state of a CD that has provided a given service by a control command sent from a CP.

The aforementioned UPnP technology can be easily and readily set and used by connecting devices to a fixed network environment.

The UPnP specification defines a method for discovery and message invoke between devices, starting from when a network connection between the devices is completed. Accordingly, once a network configuration is completed, it is possible to conveniently use the UPnP technology according to a menu provided by each vendor.

In recent years, the UPnP function has been implemented in mobile devices and/or a wireless network function has been supported by electronic appliances. Consequently, pairing between devices in a Wi-Fi network environment must be performed. Accordingly, many groups are actively researching operations for facilitating the pairing between devices.

In conventional UPnP, a user searches for a wireless access point (or an ad-hoc device) to which a UPnP device to be used is connected, and identifies the Service Set ID (SSID) information of the searched device. Thereafter, the user performs neighbor network discovery and subscription to a network configuration through the acquired SSID in a terminal supporting wireless connection, searches for relevant UPnP devices within the network in a UPnP CP, and then registers and uses devices found during the search.

However, a conventional Wi-Fi connection has been focused on simplifying and intuiting the process of identifying SSID information and then performing neighbor network discovery and subscription to a network configuration through the acquired SSID in a terminal supporting wireless connection. This results in methods in which Wi-Fi connections and user applications are separately considered. Such methods may be applied for general purposes, but do not significantly boost user convenience that a user actually feels in using the UPnP service because the user still must perform UPnP device search and registration again, after Wi-Fi connection.

Further, if a user fails to locate a desired UPnP device, due to a connection to a false AP, then the user must repeat a process of identifying the SSID of an AP, making a connection to the identified AP, and then performing UPnP device search. Accordingly, it is often very difficult for a beginner to use the UPnP service.

A method for providing UPnP device information included in Wi-Fi SSID information also exists, but there is a limitation on a data size that can be expressed.

Further, because an SSID is changes occasionally, there is a problem in that a user has to update a pre-stored connection profile information each time the SSID changes.

SUMMARY OF THE INVENTION

Accordingly, the present invention has been designed to solve at least the above-described problems occurring in the prior art, and the present invention provides at least the features and advantages as described below.

An aspect of the present invention is to provide an apparatus and method for providing information for a wireless network connection using Wi-Fi.

In accordance with an aspect of the present invention, an apparatus for providing information for a wireless network connection using Wi-Fi is provided. The apparatus includes a wireless device manager for searching a plurality of wireless devices, and analyzing device information for the plurality of wireless devices; and a wireless network manager for receiving the device information from the plurality of wireless devices, and broadcasting the device information.

In accordance with another aspect of the present invention, a method of providing information for a wireless network connection using Wi-Fi is provided. The method includes receiving device information from a plurality of wireless devices, and broadcasting the received device information.

In accordance with another aspect of the present invention, a system for providing information for a wireless network connection using Wi-Fi is provided. The system includes a plurality of wireless devices including at least one UPnP device, and a wireless Access Point (AP) for receiving device information for the at least one UPnP device, generating a device information announcement message including the device information for the at least one UPnP device, and broadcasting the device information announcement message.

BRIEF DESCRIPTION OF THE DRAWINGS

The above and other aspects, features, and advantages of certain embodiments of the present invention will be more apparent from the following detailed description taken in conjunction with the accompanying drawings, in which:

FIG. 4 schematically illustrates an information message for a UPnP device, which the UPnP device sends to a wireless AP, in a system for connecting UPnP devices in accordance with an embodiment of the present invention;

DETAILED DESCRIPTION OF EMBODIMENTS OF THE INVENTION

Figure 1:
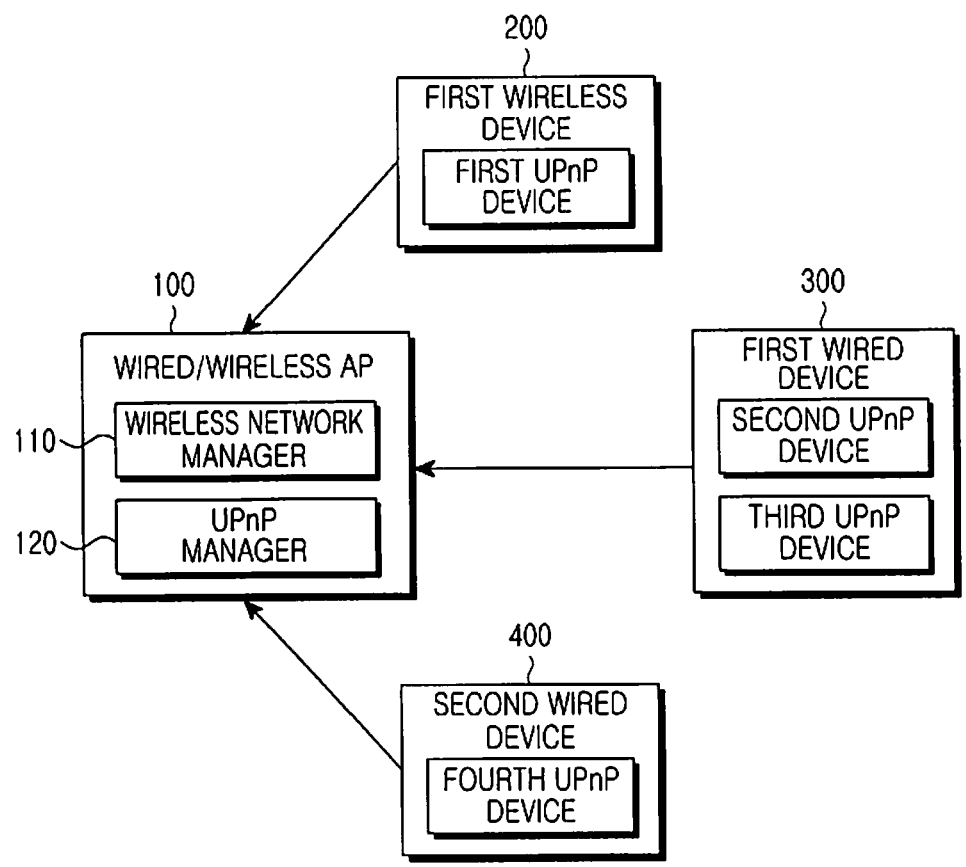
FIG. 1 is a block diagram illustrating a system for connecting UPnP devices in accordance with an embodiment of the present invention.

Hereinafter, various embodiments of the present invention will be described in detail with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention.

FIG. 1 illustrates a system for connecting UPnP devices according to an embodiment of the present invention.

Referring to FIG. 1, the system for connecting UPnP devices includes a wired/wireless Access Point (AP) 100, a first wireless device 200, a first wired device 300, and a second wired device 400. The wired/wireless AP 100 searches for UPnP devices connected thereto by wired and/or wireless networks, and acquires UPnP device information for UPnP devices found during the search. For example, the UPnP device information includes a name of the UPnP device (e.g., set by a user), a device Uniform Resource Name (URN), a device Uniform Domain Name (UDN), and a time stamp corresponding to a latest update time.

The wired/wireless AP 100 includes a wireless network manager 110 and a UPnP manager 120. The wireless network manager 110 acquires UPnP device information from UPnP devices, and broadcasts a device information announcement message including the acquired UPnP device information. In this process, the UPnP manager 120 performs a UPnP device search and analyzes results of the UPnP device search.

The device information announcement message includes UPnP device information in empty spaces of the corresponding message by using a Wi-Fi protect setup vendor extension message format. A protect setup vendor extension message is a user-definable attribute, and corresponds to a space that a manufacturer may add to a Wi-Fi Protect Setup (WPS) message. This is an item that is defined in all types of messages including WPS Information Elements (WPS IEs) within WPS probe request and response frames and M1 to M8 messages, as defined in the Wi-Fi Simple Config Specification.

The first wireless device 200 includes a first UPnP device, and the first wired device 300 includes a second UPnP device and a third UPnP device. Further, the second wired device 400 includes a fourth UPnP device. Accordingly, each of the wired and wireless devices includes at least one UPnP device, and delivers information on the included UPnP device to the wired/wireless AP 100. The UPnP devices can be searched for by the UPnP manager 120 included in the wired/wireless AP 100.

For example, when the first wireless device 200 includes a media server, UPnP device information for the first wireless device 200 may be "First UPnP Device, Friendly Name: A, URN: first media server, UUID: 2344-4543-...". When the first wired device 300 includes a media server and a media renderer, UPnP device information for the first wired device 300 may be "Second UPnP Device, Friendly Name:

B, URN: media server, UUID: 23456-5657- . . . , Last Update Time: YYYMMDDHHMMSS" and "Third UPnP Device, Friendly Name: B, URN: media renderer, UUID: 54556-7676- . . . , Extension Service: message". When the second wired device 400 includes a media server, UPnP device information for the second wired device 400 may be "Fourth UPnP Device, Friendly Name: C. URN: second media server, UUID: 45436-5674- . . . ".

Accordingly, the present invention allows a user to access an appropriate wireless AP by using UPnP device exposure information provided by wireless APs, without searching one-by-one for the SSID of a wireless AP, to which a target UPnP device is connected.

Figure 2:
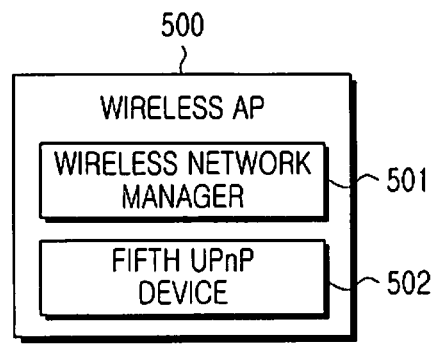
FIG. 2 is a block diagram illustrating a wireless AP including a UPnP device in accordance with an embodiment of the present invention.

FIG. 2 illustrates a structure of a wireless AP including a UPnP device according to an embodiment of the present invention.

Referring to FIG. 2, the wireless AP 500 includes a wireless network manager 502 and a fifth UPnP device 502. Because the wireless network manager 510 is configured together with the fifth UPnP device 502, it directly broadcasts a message including UPnP device information for the fifth UPnP device 502. The UPnP device information provided by the wireless network manager 501 may be "Fifth UPnP Device, Friendly Name: D, URN: media server, UUID: 34454-5647- . . . ".

Therefore, in accordance with an embodiment of the present invention, a wireless AP including a UPnP device directly provides its own UPnP device information to a user who is to make connection to the UPnP device.

Figure 3:
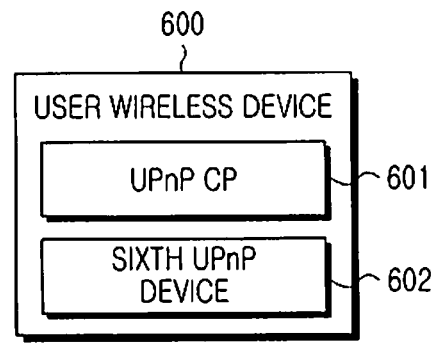
FIG. 3 is a block diagram illustrating a device for receiving a message broadcasted by a wireless AP and connecting to a UPnP device in accordance with an embodiment of the present invention.

FIG. 3 illustrates a structure of a user wireless device for receiving a message broadcasted by a wireless AP and connecting to a UPnP device according to an embodiment of the present invention.

Referring to FIG. 3, the user wireless device 600 includes a UPnP CP 601 and a sixth UPnP device 602. Here, the user wireless device 600 selects a UPnP device to which to connect to, from among exposed UPnP devices, and accesses the wired/wireless AP 100 in order to connect to the selected UPnP device. For example, the user may access the wired/wireless AP 100 by inputting a Personal Identification Number (PIN) of the wired/wireless AP 100 or by using a Push Button Configuration (PBC) function in the user wireless device 600.

The UPnP CP 601 receives UPnP device information for UPnP devices connected to the wired/wireless AP 100, from the wired/wireless AP 100, selects UPnP device information of interest from among the received UPnP device information for the UPnP devices, and connects to a UPnP device corresponding to the selected UPnP device information.

The UPnP CP 601 may also broadcast UPnP device information for the sixth UPnP device 602 included in the user wireless device 600, thereby allowing a wireless AP to receive the UPnP device information and register the UPnP CP 601.

Figure 4:
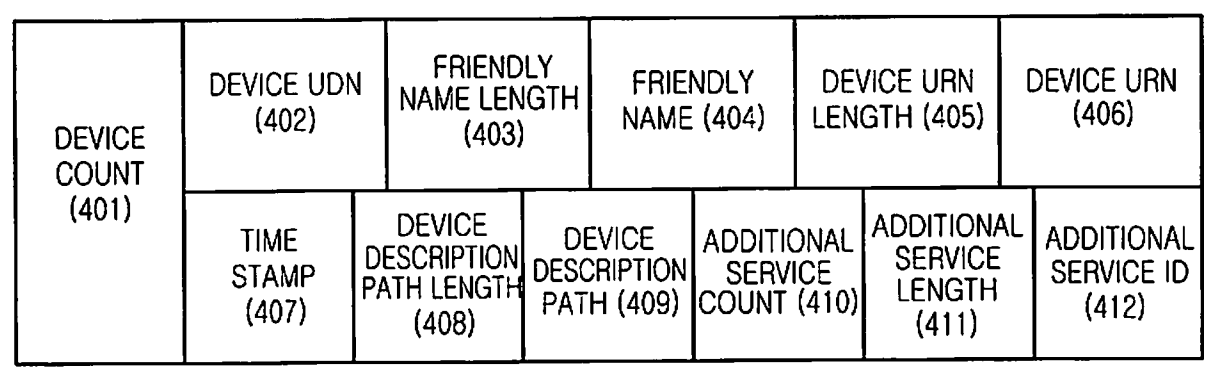

FIG. 4 schematically illustrates an information message for a UPnP device, which a UPnP device sends to a wireless AP, in a system for connecting UPnP devices according to an embodiment of the present invention.

Referring to FIG. 4, the information message for a UPnP device includes a device count field 401 indicating the number of UPnP devices connected to the wired/wireless AP 100, a device URN field 402 indicating a device ID of the UPnP device, a friendly name length field 403 indicating the length of a friendly name field, a friendly name field 404 indicating the friendly name of the UPnP device, a device URN length field 405 indicating the length of a device URN field, a device URN field 406 indicating the device URN of the UPnP device, a time stamp 407 that is a field indicating a time when the message is lastly updated, a device description path length field 408 indicating the length of a UPnP device description file address, a device description path field 409 indicating the address of a UPnP device description file, an additional service count field 410 indicating the number of additional services, an additional service length field 411 indicating the length of an additional service, and an additional service ID field 412 indicating the ID of an additional service.

The device count field 401 indicates the number of UPnP devices discovered by the wired/wireless AP 100. This number corresponds to the total sum of preset UPnP devices connected, by wire or wirelessly, within a network. The wired/wireless AP 100 generates as many information messages as the number of UPnP devices, and provides the generated information messages to a user terminal.

The device UDN field 402 includes the ID of a UPnP device to which a user is to make a connection. For example, even when a user accesses a network to which to make connection through UPnP device information broadcasted by an information message and by using the user terminal, it may be difficult to search for a UPnP device to which to make the connection from among many UPnP devices connected to the network. Accordingly, this information message includes the device UDN of a UPnP device to which a user is to make a connection, thereby allowing the user to access a network through the information message and then make the connection to the UPnP device corresponding to the device UDN included in the information message.

The friendly name length field 403 includes the size value of a friendly name field, and the friendly name field 404 indicates the friendly name of a UPnP device. Here, the friendly name may be a predetermined value or a value set by a user. In particular, the friendly name is used as a value by which users of UPnP devices can actually distinguish between information for UPnP devices.

The device URN length field 405 includes the size value of a device URN field, and the device URN field 406 indicates the device URN of a UPnP device. For example, the device URN may be expressed in the form of "urn:schemas-upnp-org:device:MediaServer:1". This device URN represents the version information of a UPnP device and the type of the UPnP device, such as a media server or media renderer, and may also be device information newly created by a vendor according to the UPnP specification.

The time stamp field 407 indicates a time when the message was last updated. For example, when a user is to access a UPnP media server and perform a data sink operation, the user references the time stamp value in order to check if the UPnP media server is a previously accessed UPnP media server.

The device description path length field 408 indicates the length of a UPnP device description file address, and the device description path field 409 includes a value acquired as a result of performing a process for searching for intra-network service in a network. Through this device description path field 409, the wired/wireless AP 100 may omit a UPnP device search process and directly acquire UPnP device information when it knows the IP address to be allocated to a terminal.

The UPnP search process is performed using the UPnP device search (M-search) method specified in the UPnP specification.

The M-search method is used to search for intra-network service by using the multicast channel of an IP address in a network. The intra-network service is searched for after the UPnP device search, but information thereon is not sufficient. Thus, UPnP devices provide UPnP device information by exposing device description information. A CP within the network requests device descriptions for UPnP devices, which respond to the UPnP device search result, thereby acquiring accurate information on the UPnP devices. For example, the UPnP device information includes a UPnP Unique ID (UUID), a UPnP type, service, etc.

Further, the device description path value is configured in the format of, for example, ":8080/DeviceDescription.xml", and the wired/wireless AP 100 can acquire detailed information on a UPnP device by combining the IP of a physical device to which the UPnP device belongs with the above format value. When an IP and a UPnP device description value are combined in this way, a UPnP device search operation may be omitted, shortening the time required for connection between devices.

The additional service count field 410 indicates the number of subordinate service types to be additionally provided to a UPnP device, and the additional service length field 411 indicates the length of a subordinate service type.

The additional service ID field 412 indicates the ID of a subordinate service type. When the functionality of a UPnP device is extended and additional services are added, the additional services are provided with basic information on the UPnP device.

Therefore, in accordance with an embodiment of the present invention, information on a UPnP device is provided through the device information announcement message, thereby allowing a user to quickly connect to a UPnP device of interest.

Figure 5A:
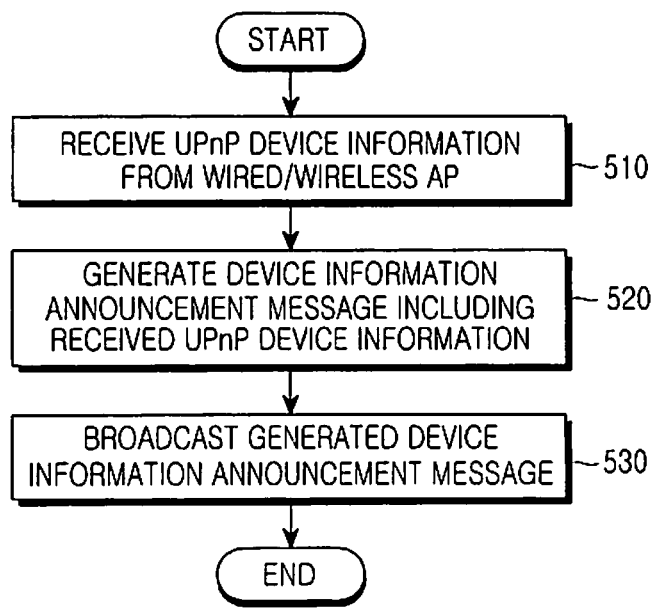
FIG. 5A is a flowchart illustrating a procedure in which a wireless AP provides information for connecting UPnP devices in accordance with an embodiment of the present invention.
Figure 5B:
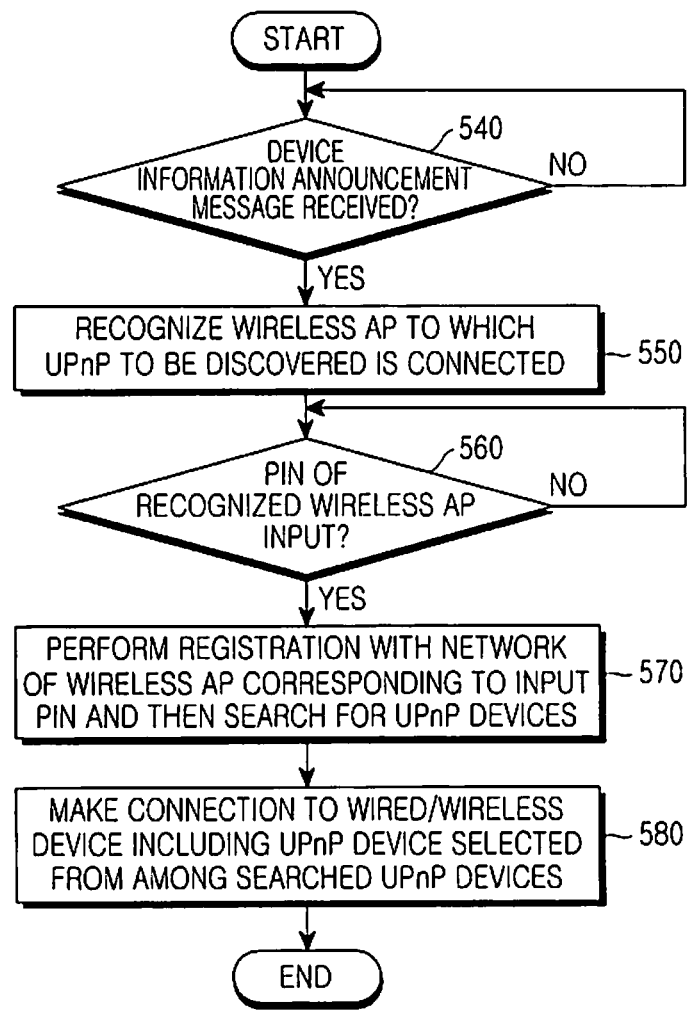
FIG. 5B is a flowchart illustrating a procedure in which a user wireless device connects to a UPnP device in accordance with an embodiment of the present invention.

FIG. 5A illustrates a procedure in which a wireless AP provides information for connecting to UPnP devices according to an embodiment of the present invention, and FIG. 5B illustrates a procedure in which a user wireless device connects to a UPnP device according to an embodiment of the present invention.

Referring to FIG. 5A, in step 510, the wired/wireless AP 100 receives UPnP information from wired/wireless devices connected thereto. Here, each of the wired/wireless devices is already connected to the wired/wireless AP 100 by a UPnP network, and includes a UPnP device, such as a media server or media renderer.

In step 502, the wired/wireless AP 100 generates a device information announcement message including the received UPnP device information.

In step 530, the wired/wireless AP 100 broadcasts the generated device information announcement message to the devices existing in the network.

Referring to FIG. 5B, in step 540, the user wireless device 600 waits for a device information announcement message is received. When a device information announcement message is received, the user wireless device 600 recognizes the wired/wireless AP 100 to which a UPnP device to be searched for is connected in step 550.

In step 560, the user wireless device 600 waits for the PIN of the wired/wireless AP 100 to be input. When the PIN is, in step 570, the user wireless device 600 registers itself with the network of the wired/wireless AP 100 corresponding to the input PIN, and then searches for a UPnP device to which to make connection.

In step 580, the user wireless device 600 connects to the wired/wireless device including a UPnP device that is selected from among the searched UPnP devices by the user of the user wireless device 600.

As described above, a user wireless device can access a network through a received device information announcement message, directly search for a UPnP device to which to make connection, and connect to the searched UPnP device.

Figure 6:
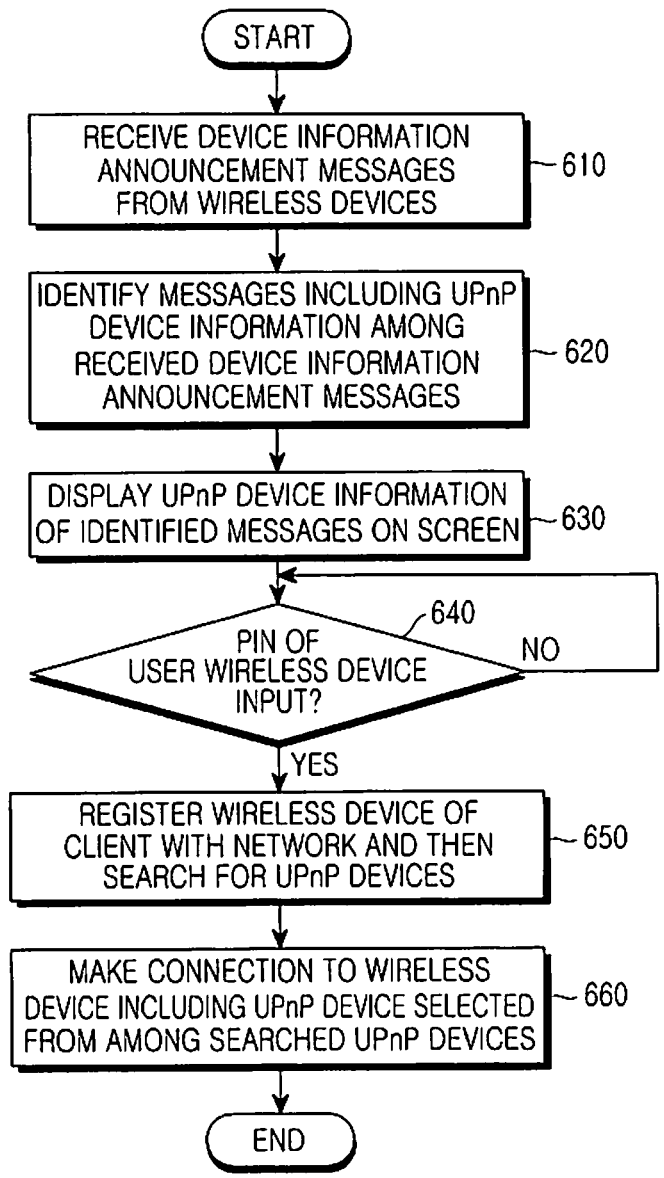
FIG. 6 is a flowchart illustrating a procedure in which a wireless AP receives a device information announcement message from a wireless device including a UPnP device, and connects to the corresponding wireless device in accordance with an embodiment of the present invention.

FIG. 6 illustrates a procedure in which a wireless AP receives a device information announcement message from a wireless device including a UPnP device, and connects to a corresponding wireless device, according to an embodiment of the present invention.

Referring to FIG. 6, in step 610, the wired/wireless AP 100 receives device information announcement messages from at least one wireless device. For example, a wireless device including a UPnP device generates and broadcasts a device information announcement message including device information for its own UPnP device, and a wireless device not including a UPnP device broadcasts a device information announcement message excluding UPnP device information.

In step 620, the wired/wireless AP 100 identifies messages including UPnP device information among the received device information announcement messages, and in step 630, the wired/wireless AP 100 arranges the UPnP device information included in the identified device information announcement messages, and displays the arranged UPnP device information.

In step 640, the wired/wireless AP 100 waits for the PIN of the wireless device of a user who is to use a UPnP device to be input. When the PIN is input, in step 650, the wired/wireless AP 100 registers the wireless device with its network, and then searches for UPnP devices. For example, the UPnP device search (M-search) method specified in the UPnP specification may be used as a method of searching the UPnP devices.

For example, the user wireless device displays the PIN on the screen so that the user can input the PIN in the wireless AP. However, if the wireless AP and the user wireless device have been previously connected to each other, then the user wireless device may be connected to the wireless AP by using previous connection information without inputting the PIN.

In step 660, the wired/wireless AP 100 connects to the wireless device corresponding to UPnP device information that is selected by the user wireless device from among the searched UPnP devices.

As described above, in accordance with an embodiment of the present invention, a wireless device, which has been previously connected to the wired/wireless AP 100, can be directly connected to the network and use a UPnP device without inputting its PIN or using the PBC function.

Figure 7:
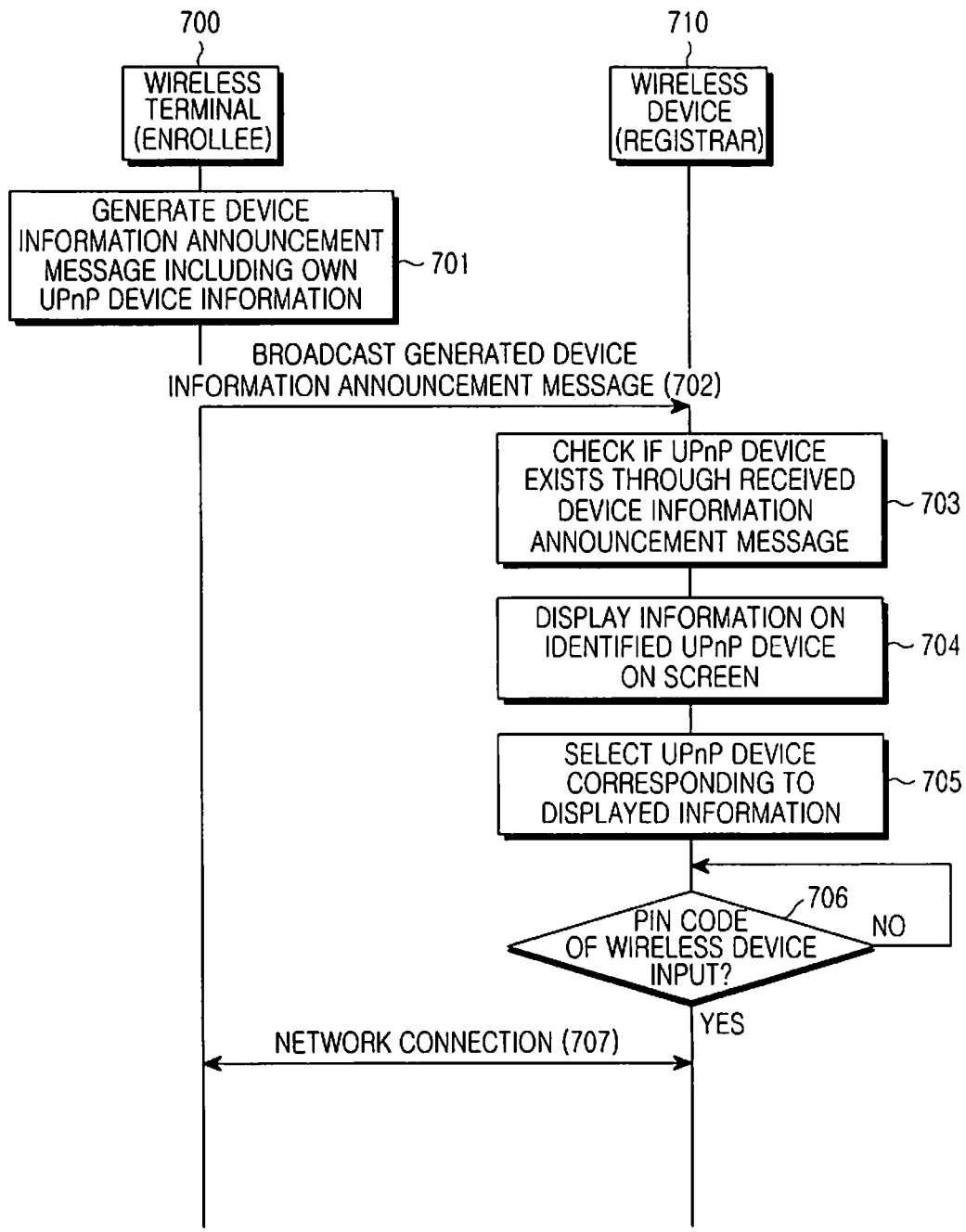
FIG. 7 is a flowchart illustrating a procedure in which a wireless device equipped with a wireless LAN card is connected to a wireless terminal, and performs data synchronization with the wireless terminal in accordance with an embodiment of the present invention.

FIG. 7 illustrates a procedure in which a wireless device equipped with a wireless LAN card is connected to a wireless terminal, and performs data synchronization with the wireless terminal, according to an embodiment of the present invention.

In FIG. 7, the wireless device 710 is a PC equipped with a wireless LAN card, and has a wireless AP function. Further, both the wireless device 710 and the wireless terminal 700 include a UPnP device, such as a UPnP media server.

For example, when the user of the wireless terminal 700 desires to store content possessed in the PC, using the wireless terminal 700, the user may request a Wi-Fi network connection from the PC (the wireless device 710) by clicking the Wi-Fi network synchronization button of the wireless terminal 700.

In step 701, the wireless terminal 700 generates a device information announcement message including information on its UPnP device. The device information announcement message includes information, such as the URN, friendly name, and UDN of the UPnP device included in the wireless terminal 700.

In step 702, the wireless terminal 700 broadcasts the generated device information announcement message to neighbor devices including the wireless device 710.

In step 703, the wireless device 710 checks if a UPnP device exists through the received the received device information announcement message. When a UPnP device is discovered, the wireless device 800 displays information on the discovered UPnP device on the screen in step 704.

When the user enters a selection for the UPnP device using the wireless terminal 700 or the wireless device 710, the wireless device 710 selects the UPnP device corresponding to the displayed information in step 705.

In step 706, the wireless device 710 waits for the PIN code of the wireless terminal 700 to be input, and when the PIN code is input, the wireless device 710 completes Wi-Fi network connection to the wireless terminal 700 in step 707.

For example, the user may use the device information announcement information for automatic data synchronization between the wireless terminal 700 and the wireless device 710 later on.

The wireless device 710 compares the time stamp value of the UPnP device information included in the device information announcement message from the wireless terminal 700 with its own time stamp value, thereby checking if the time stamp value of the wireless terminal 700 corresponds to the latest updated time. When the checked time stamp value of the wireless terminal 700 corresponds to the latest updated time, the wireless device 800 can be automatically connected to the wireless terminal 700, even when a Wi-Fi connection is not made.

Further, after a wireless terminal and a wireless device are connected to each other, if the wireless terminal and the wireless device store connection-related profile information, the wireless terminal and the wireless device can subsequently connect to each other again without the PIN inputting.

As described above, in accordance with an embodiment of the present invention, a user easily connects to a wireless device using a wireless terminal by performing network connection to the wireless device through a device information announcement message from the wireless terminal.

Figure 8:
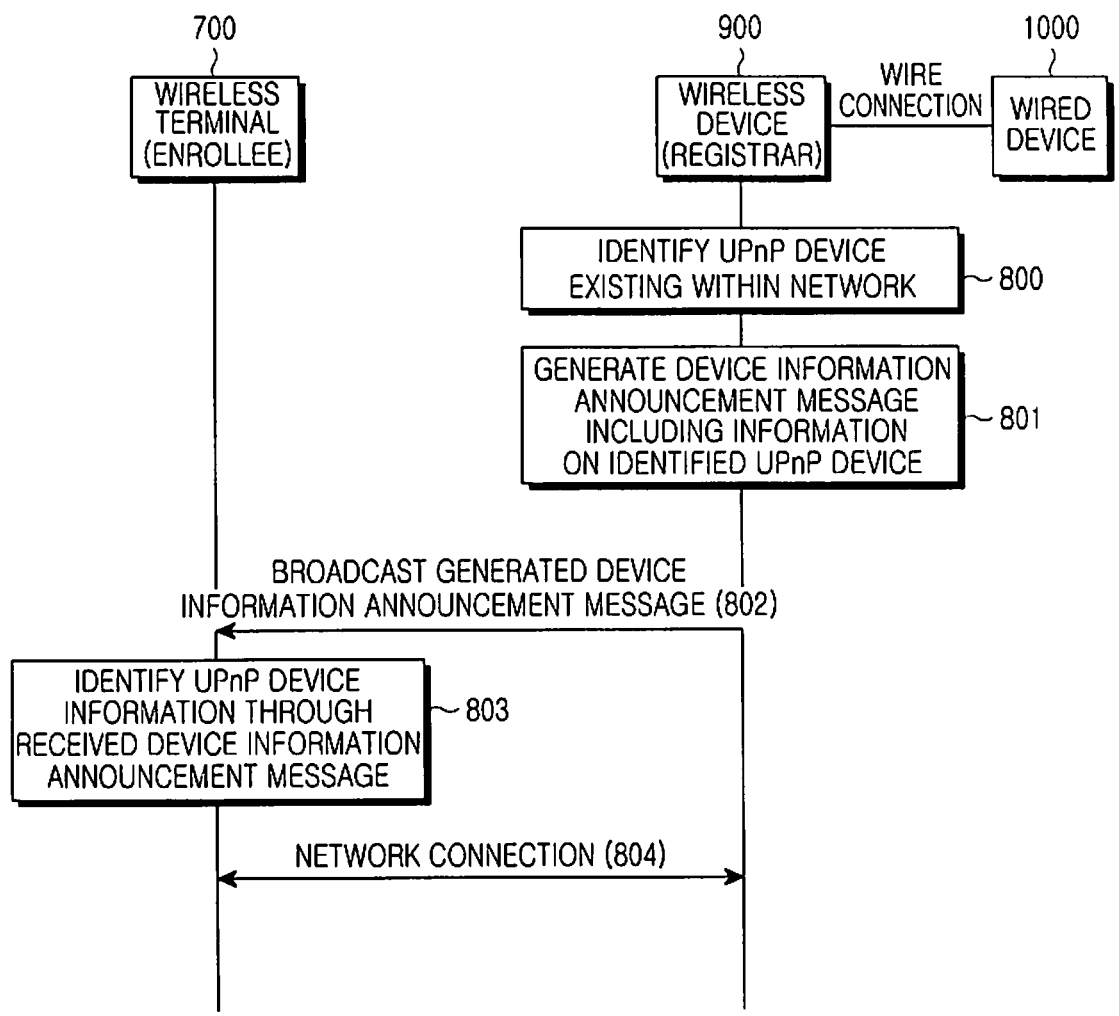
FIG. 8 is a flowchart illustrating a procedure in which a wireless terminal is connected to a wired device by using a UPnP device provided in the wired device, in order to reproduce content in accordance with an embodiment of the present invention.

FIG. 8 illustrates a procedure in which a wireless terminal connects to a wired device by using a UPnP device provided in the wired device, which is connected to a wireless device, in order to reproduce a content, according to an embodiment of the present invention.

With reference to FIG. 8, a description will be given of an example where the wireless terminal 700 includes a media server and a media controller as UPnP devices, and the wired device 1000 includes a media renderer, and the user of the wireless terminal 700 selects a content by using the media server and then searches for a media renderer for reproducing the selected content.

In step 800, the wireless device 900 identifies UPnP devices existing within its own network. Accordingly, the wireless device 900 is provided with a UPnP device search function, and identifies information on UPnP devices included within the network by using the UPnP search function.

The wireless device 900 generates a device information announcement message including the UPnP device information on the identified UPnP devices in step 801, and broadcasts the generated device information announcement message in step 802.

In step 803, the wireless terminal 700 identifies the UPnP device information through the received device information announcement message. That is, the wireless terminal 700 identifies that the wireless device 900 is connected to the wired device 1000 including the media renderer.

In step 804, the wireless terminal 700 selects connection to the wired device 1000 including the media renderer, and performs network connection.

For example, when the wireless terminal 700 is initially connected to the wireless device 900, the wireless terminal 700 displays a popup window for inputting the PIN of the wireless device 900, or performs the connection to the wireless device 900 by using the PBC function of the wireless device 900. Subsequently, the wireless terminal 700 can search for the media renderer, which is provided in the wired device 1000 connected to wireless device 900, by using the UPnP device search function, and then reproduce the content using the searched media renderer.

Accordingly, in accordance with an embodiment of the present invention, the wireless terminal 700 can directly select the media renderer without being provided with separate information for Wi-Fi connection.

As described above, the various embodiments of the present invention reduce the time required for connection between a device supporting wireless connection and a wireless terminal including a UPnP device by providing, in advance, information on the UPnP device in the device supporting wireless connection, and allow a user to quickly connect the device supporting wireless connection and the wireless terminal.

While the present invention has been shown and described with reference to certain embodiments thereof, it will be understood by those skilled in the art that various changes in form and details may be made therein without departing from the spirit and scope of the present invention as defined by the appended claims and any equivalents thereof.

What is claimed is:

1. A terminal for a wireless network connection using Wireless-Fidelity (Wi-Fi), the terminal comprising:
 a display;
 a transceiver configured to communicate with a plurality of Access Points (APs), wherein each of the plurality of APs is connected to a plurality of devices and receives device information of the plurality of devices from the plurality of devices; and
 a processor configured to:
  receive, from the plurality of APs through the transceiver, device information announcement messages, wherein each of the device information announcement messages includes the device information of the plurality of devices, and the device information of the plurality of devices includes identifications (IDs) of the plurality of devices and a total number of the plurality of devices;
  control the display to display the device information included in the device information announcement messages received from the plurality of APs;
  in response to an input for selecting a device from among the plurality of devices based on the displayed device information, transmit, to an AP connected to the selected device from among the plurality of APs, information for connecting the terminal to the AP through the transceiver;

connect the terminal to the AP connected to the selected device through the transceiver;

search a plurality of devices connected to the AP; and connect the terminal to the selected device from among the plurality of devices connected to the AP through the transceiver, wherein the device information announcement comprises a device ID, a friendly name, a time stamp indicating a last update time, a device description file, and addition service information for each of the plurality of devices.

2. The terminal of claim 1, wherein the processor is further configured to, when AP information of the AP is input, register itself with a network of the AP using the input AP information, and search for the selected device to which to make a connection.

3. The terminal of claim 1, wherein the processor is further configured to broadcast device information of the terminal.

4. A method of providing information for a wireless network connection using Wireless-Fidelity (Wi-Fi), in a terminal, the method comprising the steps of:

receiving, from a plurality of Access Points (APs), device information announcement messages through a transceiver of the terminal, wherein each of the plurality of APs is connected to a plurality of devices and receives device information of the plurality of devices from the plurality of devices, each of the device information announcement messages includes the device information of the plurality of devices, and the device information of the plurality of devices includes identifications (IDs) of the plurality of devices and a total number of the plurality of devices;

controlling a display of the terminal to display the device information included in the device information announcement messages received from the plurality of APs;

in response to an input for selecting a device from among the plurality of devices based on the displayed device information, transmitting, to an AP connected to the selected device from among the plurality of APs, information for connecting the terminal to the AP through the transceiver;

connecting the terminal to the AP connected to the selected device through the transceiver;

searching a plurality of devices connected to the AP;

connecting the terminal to the selected device from among the plurality of devices connected to the AP through the transceiver wherein the device information announcement message comprises a device ID, an friendly name, a time stamp indicating a last update time, a device description file, and additional service information for each of the plurality of devices.

5. The method of claim 4, further comprising:

when AP information of the AP is input, registering the terminal with a network of the AP using the input AP information; and searching for the selected device to which to make a connection.

6. The method of claim 4, further comprising:

broadcasting device information of the terminal.

\* \* \* \* \*